United States Patent
Maisch

[19]
[11] Patent Number: 5,941,924
[45] Date of Patent: Aug. 24, 1999

[54] METHOD AND DEVICE FOR CONTROLLING A VEHICLE BRAKING SYSTEM

[75] Inventor: Wolfgang Maisch, Schwieberdingen, Germany

[73] Assignee: Robert Bosch GmbH, Stuttgart, Germany

[21] Appl. No.: 09/011,363

[22] PCT Filed: Jun. 12, 1996

[86] PCT No.: PCT/DE96/01026

§ 371 Date: Feb. 20, 1998

§ 102(e) Date: Feb. 20, 1998

[87] PCT Pub. No.: WO97/08028

PCT Pub. Date: Mar. 6, 1997

[30] Foreign Application Priority Data

Aug. 22, 1995 [DE] Germany .......................... 195 30 735

[51] Int. Cl.$^6$ .......................................... G06F 7/70
[52] U.S. Cl. ............................... 701/70; 701/71; 701/78; 701/82; 180/197
[58] Field of Search ................................. 701/70, 71, 72, 701/73, 74, 78, 83, 84, 82; 303/140, 139, 167, 189; 180/197

[56] References Cited

U.S. PATENT DOCUMENTS

| 5,090,318 | 2/1992 | Schenk et al. | 188/72.1 |
| 5,312,170 | 5/1994 | Erban et al. | 303/150 |
| 5,732,377 | 3/1998 | Eckert | 701/83 |
| 5,742,507 | 4/1998 | Eckert | 701/70 |
| 5,774,821 | 6/1998 | Eckert | 701/78 |

FOREIGN PATENT DOCUMENTS

| 33 13 078 | 4/1983 | Germany . |
| WO 83/03230 | 9/1983 | WIPO . |

Primary Examiner—William A. Cuchlinski, Jr.
Assistant Examiner—Gertrude Arthur
Attorney, Agent, or Firm—Kenyon & Kenyon

[57] ABSTRACT

A method and a device for controlling the braking system of a vehicle, in particular in conjunction with brakes having electromotive brake application, the individual wheel brakes being actuated within the scope of a closed-loop control, which produces the same friction coefficient at the wheels. The wheel contact patch forces of the vehicle are determined indirectly from the braking forces detected at the individual wheel brakes.

9 Claims, 3 Drawing Sheets

METHOD AND DEVICE FOR CONTROLLING A VEHICLE BRAKING SYSTEM

FIELD OF THE INVENTION

The present invention relates to a method and device for controlling a vehicle braking system.

BACKGROUND INFORMATION

A method and a device of this kind are disclosed by PCT International Publication No. WO-A1 83/03230. The braking regulator it describes comprises controlling the slip at each of the vehicle's wheels to a predefined value during a braking operation. A controller controls the pressure in a pneumatic or hydraulic braking system at the individual wheel brakes in such a way that the slip at all the wheels assumes the predefined value. The slip regulation aids in achieving uniform tire and brake wear.

A similar effect is achieved by regulating all wheels to the same brake wear. In this connection, for a pressure-regulated braking system, the German 33 13 078 C2 discloses using wear sensors to detect brake wear and to reduce or hold back the brake pressure at those wheel brakes where a heavier wear occurs.

What is desirable in connection with brake system controls is the knowledge of the momentary wheel contact patch forces (wheel loads). When the wheel contact patch forces are known, the control of the braking system, in particular control functions, such as anti-lock control, operating dynamics control, traction control or chassis control, can be adapted to the current vehicle load.

The related art referred to above provides for sensors to detect the wheel's contact patch forces. Such sensors represent substantial additional outlay.

It is the object of the present invention to specify measures for determining wheel contact patch forces, which will eliminate the need for additional sensory mechanisms.

SUMMARY OF THE INVENTION

The present invention provides a cost-effective way of determining the wheel contact patch forces or the relative wheel loads. These values are used advantageously in the control of the braking system.

The present invention also advantageously achieves a uniform distribution of the braking forces over all the wheels, with the largest possible braking factor, given a good directional stability and uniform tire and brake wear.

It is especially advantageous that the data determined in the case of brakes with electromotive actuation be retrieved to ascertain any braking variations occurring during vehicle operation.

DETAILED DESCRIPTION

Figure 1:
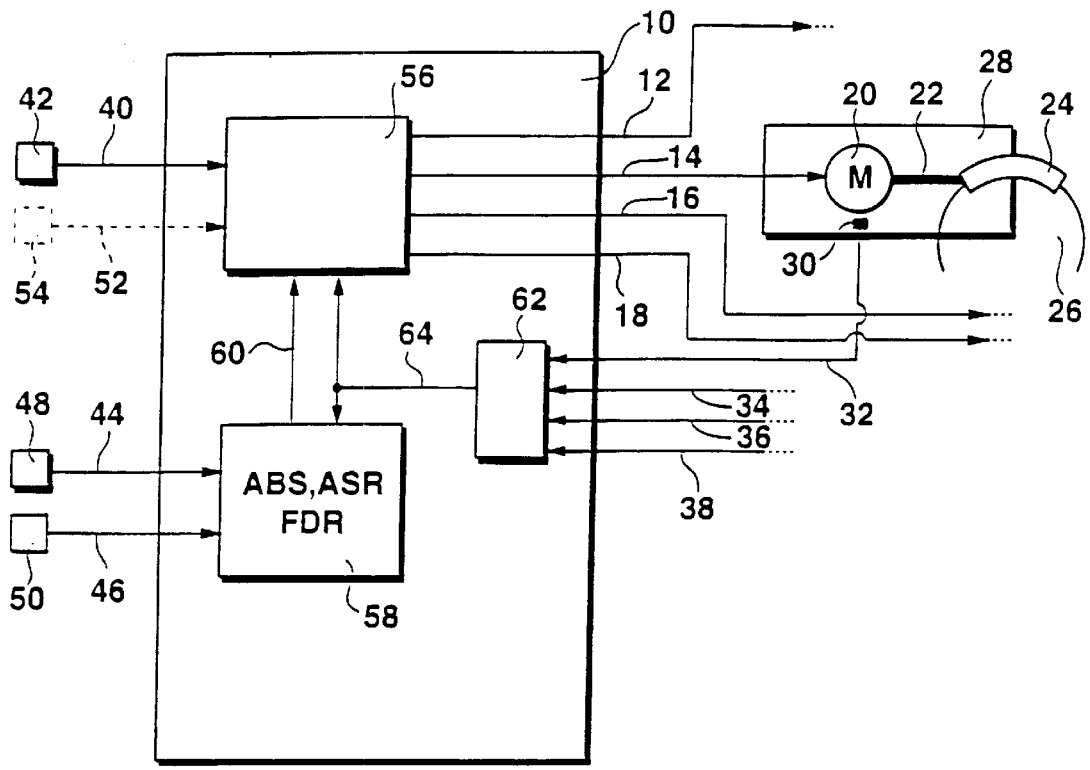
FIG. 1 illustrates a block diagram of a method for controlling a vehicle braking system according to an embodiment of the present invention.

FIG. 1 depicts an electronic control unit 10, which, by way of output lines 12, 14, 16 and 18, actuates the wheel brakes of a dual-axle vehicle. In the preferred exemplary embodiment, an electromotive brake controller is used, which is sketched in FIG. 1 based on the example of a wheel brake.

The output line leads in each case—via an output stage (not shown)—to an electromotor 20, which is coupled via a mechanical connection 22 to brake calipers 24 of wheel 26. Provision is also made in the vicinity of brake controller 28 for a measuring device 30 for detecting the exerted brake force. A line 32 leads from measuring device 30 back to control unit 10. In a comparable manner, lines 34, 36 and 38 lead from the other wheel brakes to control unit 10. To determine the braking force, the preferred exemplary embodiment provides for using strain gauges for detecting the force exerted by the electromotor on the brake calipers. In one preferred exemplary embodiment, one draws alternatively or additionally upon the current flowing through the motor or upon the incremental step number to determine the braking force.

Also feeding into control unit 10 is an input line 40 from a measuring device for brake pedal actuation. Additionally feeding into control unit 10 are lines 44 through 46 from measuring devices 48 through 50 for detecting wheel velocities.

Also leading to control unit 10 in one advantageous exemplary embodiment are input lines 52, which emanate from measuring devices 54 used for detecting the actual value (slip, wear) at the individual wheels of the vehicle used for the closed-loop control described in the following.

Control unit 10, comprised of at least one microcomputer, contains the following functional blocks (program blocks). A first functional block 56 is used for controlling the wheel brakes. Preferably feeding into it are input line 40, if indicated input lines 52, as well as in one advantageous exemplary embodiment input lines 44 through 46. A second functional block 58 symbolizes functions having an effect on the braking system, such as anti-lock control (ABS), traction control (ASR), operating dynamics control (FDR), etc. Input lines 44 through 46, as well as input variables (not shown) that are essential to the functions lead to this functional block. Functional blocks 58 and 56 are connected via a line 60.

Output lines 12 through 18 emanate from functional block 56. A third functional block 62 is used for determining the relative wheel contact patch forces, as well as in some instances for monitoring the individual wheel brakes. It has input lines 32 through 38 leading to it. Via an output line 64, functional block 62 is linked to functional block 56, as well as to functional block 58.

The brakes are controlled within the framework of functional block 56, i.e., a state variable is controlled in closed loop to a setpoint value predefined by the driver. A state variable of this kind is the wheel slip or the wheel velocity; in another advantageous exemplary embodiment a variable for the brake wear.

By actuating the brake pedal, the driver defines a setpoint value for the control loop, said setpoint value being determined through monitoring of the pedal travel and/or of the exerted pedal force. Said control loop adjusts each of the wheel brakes individually by comparing the setpoint value to the actual values measured at the wheel brakes in question by actuating the wheel brakes' electromotive brake application. Special functions, such as ABS, ASR and/or FDR likewise have an effect on the particular wheel brake in question. In this context, in the preferred exemplary embodiment, a change is made in the wheel-specific setpoint value predefined by the driver. The relative wheel contact patch forces are determined in functional block 62 from the braking forces detected at the wheel brakes. Any discrepancies in the area of the individual wheel brakes can be revealed by running a plausibility check on the determined values, individually and with respect to one another. The information to this effect (wheel contact patch forces or discrepancies) is made available both to functional block 58 as well as to functional block 56, which, when calculating the values to be set for the wheel brakes, takes the wheel loads into consideration, or in response to discrepancies, resorts to emergency measures.

Figure 2:
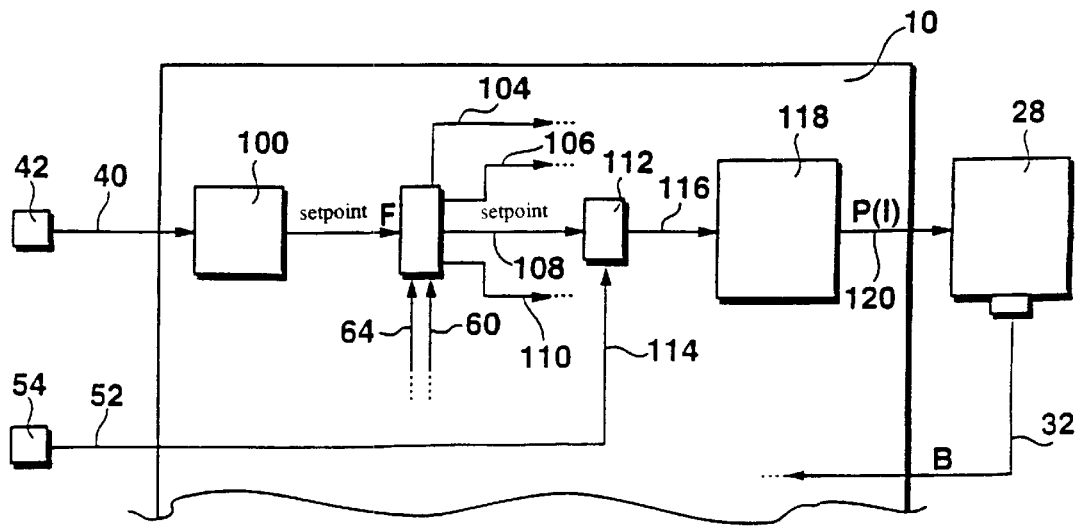
FIG. 2 illustrates a block diagram of closed loop control of a vehicle braking system according to an embodiment of the present invention.

FIG. 2 depicts a block diagram of the closed-loop control described above. From the driver's command supplied via line 40, the setpoint value SOLLY specified by the driver is determined within the scope of a table or characteristics map 100. A control to predefined wheel slip setpoint values follows in the preferred exemplary embodiment. This means that the characteristics map or table 100 converts the degree of actuation of the brake pedal (path and/or force signal) into a wheel slip setpoint value. The setpoint value predefined by the driver is divided in a setpoint generator 102 into slip setpoint values for each of the wheel brakes. In this context, the information supplied via lines 60 and 64 with respect to discrepancies, relative wheel loads, and additional functions, is taken into consideration. For example, in the case of intervention by the operating dynamics controller, the setpoint value is altered at the selected wheel brakes in the sense of the operating dynamics control. The wheel-specific setpoint value is supplied via lines 104, 106, 108 or 110. It is shown based on the example of a wheel brake, that line 108 leads to a differentiator 112, where the predefined setpoint value is compared to the actual value for wheel slip supplied via line 114. This actual value can be detected by appropriate measuring devices or be calculated on the basis of the wheel velocities and the vehicle velocity. The difference between setpoint and actual value is fed via line 116 to controller 118, whose output line 120 leads to brake controller 28. Within the scope of a specified closed-loop control strategy (e.g., PID), controller 118 defines an output signal, which leads to the actual value approaching the setpoint value. The braking force exerted at the brake then adjusts itself in conformance with the output signal from the controller.

The closed-loop control depicted in FIG. 2 controls the braking forces at the wheels so as to achieve the same slip, predefined by the driver, at all wheels. In one simplified specific embodiment, the same braking force is applied to the wheels of one axle, since the assumption can then be made that the wheel contact patch forces at one axle are the same.

Given the same slip at all wheels, at least given the same tire-road interface friction coefficient, after a certain braking time, braking forces arise, which are proportional to the wheel contact patch forces at the wheels in question. By determining the brake actuation force, and in view of the brake design, inclusive of the friction coefficients of the brake linings, the relative patch contact forces, i.e., ratios of the wheel forces among themselves, are estimated. This is done by statistical averaging, since the friction coefficient between tire and road fluctuates.

It is especially advantageous to determine the patch contact forces following travel begin, since the load state of the vehicle no longer changes then.

The knowledge of the relative wheel patch contact forces is used to estimate the gravitational center of the vehicle. This is particularly important for front-wheel-drive vehicles having a large load-carrying capacity in the rear.

Besides the described closed-loop control of the braking forces or braking torques to predefined slip or to predefined wheel velocities, in another advantageous example, the control is carried out to effect the same brake wear at all wheels. Here, as well, braking forces arise, which are proportional to the relative wheel contact patch forces.

Thus, what is important is that the wheel contact patch forces are determined during one control phase, in which the braking forces that ensue are proportional to the relative wheel contact patch forces. This is the case when the same tire-road interface friction coefficient or the same wear occurs at all wheel brakes. This operating situation is guaranteed by a closed-loop control to the same slip, speed, wheel velocity or wear. In one advantageous exemplary embodiment, this control is only active in predefined operating states for determining the wheel contact patch force, while otherwise other closed-loop controls (e.g., deceleration control, pressure control, braking force control, etc.) are active. If it is possible to determine the tire-road interface friction coefficient, such an operating situation (the same friction coefficient at all wheels) can be recognized and the wheel contact patch forces determined.

Figure 3:
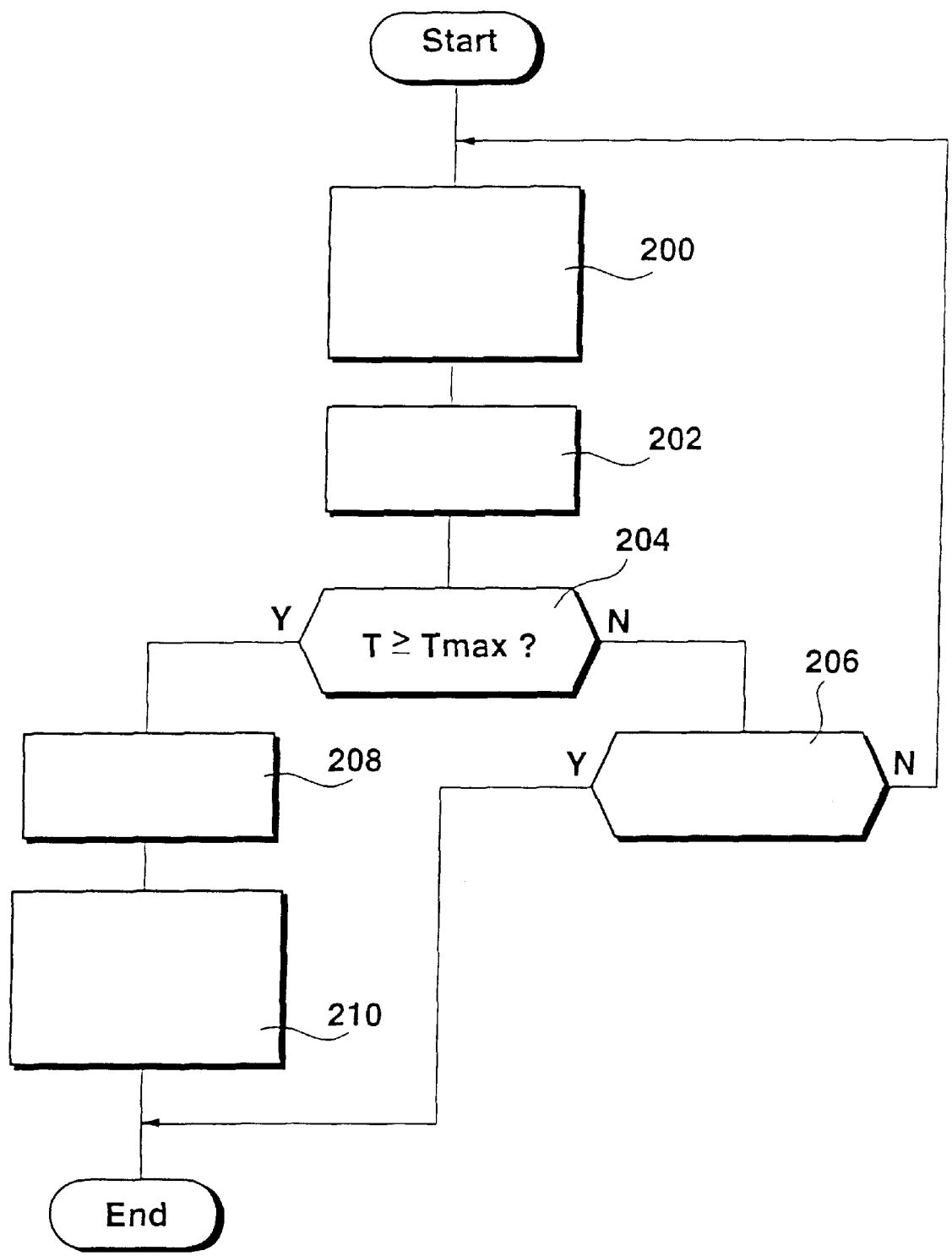
FIG. 3 illustrates a flow chart for a computer program, according to an embodiment of the present invention, which implements a method for determining the relative wheel contact patch forces.

On the basis of a flow chart, FIG. 3 depicts the determination of the relative wheel contact patch forces, in a realization as a computer program.

After the start of the program segment, which is initiated, e.g., upon actuation of the brake pedal (closing of the brake pedal switch), the braking forces Bi input in first step 200 are measured at the wheels of the vehicle. The ascertained wheel brake forces are averaged in step 202. Subsequent query step 204 checks whether a tracking counter has reached or exceeded its maximum value. If this is not the case, step 206 checks whether the braking operation has ended. If the braking operation has ended in the meantime, the program segment is ended and started anew during the next braking operation. If the braking operation has not ended, the program segment is repeated with step 200.

If it is recognized in step 204 that the counter has reached or exceeded its maximum value, then the assumption can be made that sufficient time has elapsed for detecting the determined braking forces and that the same friction coefficient is at hand at all wheels. The determination of the relative wheel contact patch forces is initiated accordingly. The quotient is initially formed in step 208, in each case between two wheel brake forces Bi/Bj. In this context, the braking forces of different vehicle sides of opposite axles are preferably retrieved. This means that a quotient is formed from the braking force at the left front wheel and the right rear wheel, and a quotient is formed from the right front wheel and the left rear wheel. In other advantageous exemplary embodiments, the braking forces of the same vehicle side can be retrieved. After the quotients are formed, the relative contact patch forces Ni/Nj are determined in step 210. These result in view of the brake design, the coefficient of friction of the brake linings, as well as the friction radii (combined in constant K) proportional to the relative brake forces. In step 210, the relative wheel contact patch force between the front and rear axle of the dual-axle vehicle is determined. The program segment is ended after the relative wheel contact patch forces are determined.

The absolute wheel contact patch force can be estimated from the relative forces within the framework of certain tolerances, given knowledge of the current vehicle mass.

In one advantageous specific embodiment, when calculating the relative contact patch forces, the result is checked by comparing the two contact patch forces determined on the basis of various braking force values to one another. A correct measurement is assumed when deviations are within a tolerance, while the result is rejected when a deviation is outside of a tolerance.

The values determined for the relative wheel contact patch forces are retrieved in one advantageous exemplary embodiment in the case of electromotive brake actuation, to detect changes in the brakes over the course of vehicle operation. For this purpose, the plausibility of the detected values is continually checked for the individual wheels.

Figure 4:
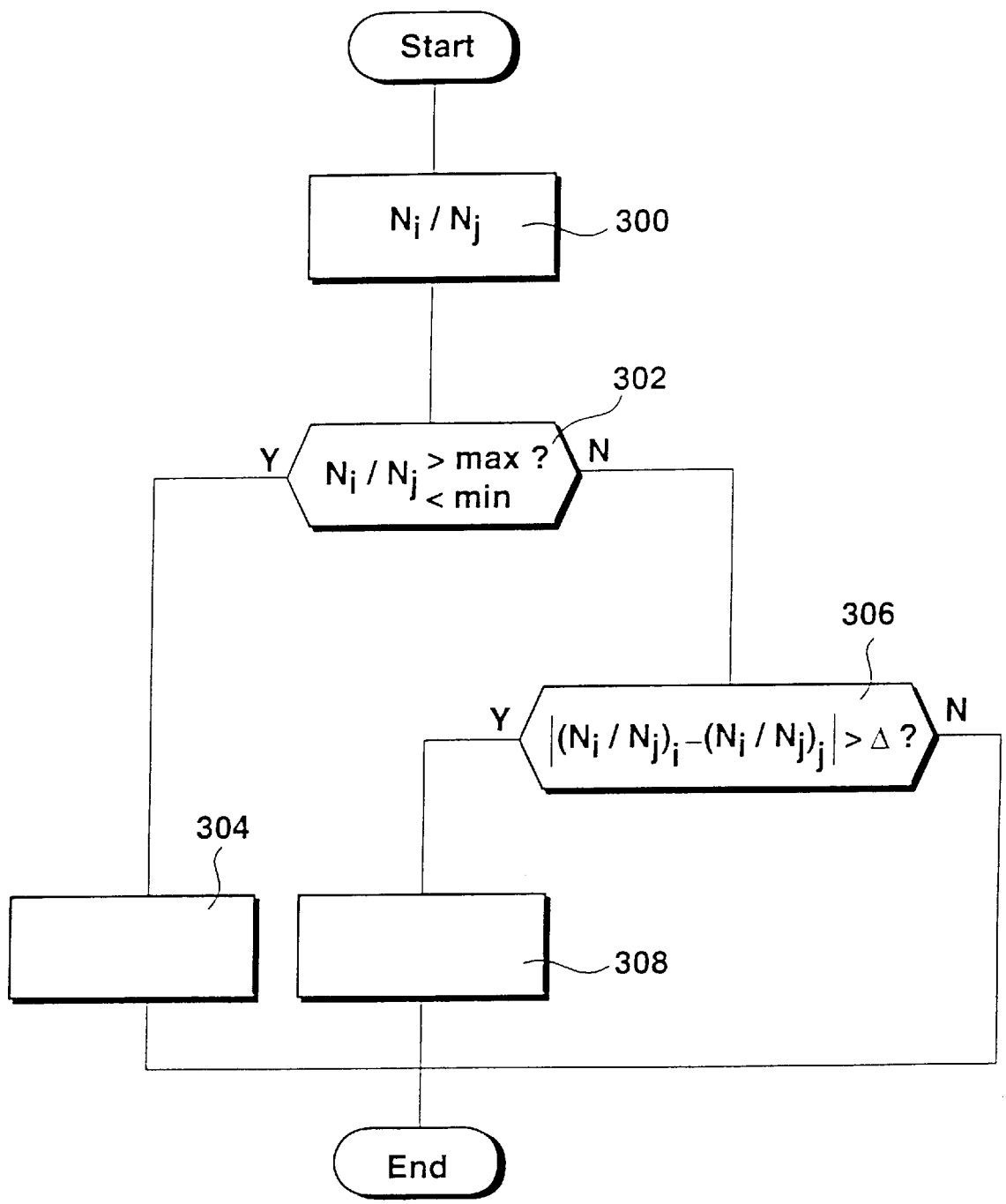
FIG. 4 illustrates a flow chart for a computer program, according to an embodiment of the present invention, which implements a method for determining the plausibility of the detected relative wheel contact patch forces.

An example of this refinement is depicted in the flow chart of FIG. 4. After a program segment is started, following a determination of the relative wheel contact patch forces, the determined values are input in first step 300. In step 302, the determined values are then compared to useful physical maximum or minimum values. If the determined relative values exceed or fall below the limiting values, than a change at the brakes is ascertained in accordance with step 304. Accordingly, a possible error status is assumed in the area of the brakes underlying this calculation. The program segment is ended following step 304. If the values determined for the relative wheel contact patch forces lie within the tolerance range, then, in accordance with step 306, the amount of the difference of the detected relative values is compared to a predefined tolerance range A. If the amount of the difference is greater than the tolerance value A, in accordance with step 308, a discrepancy is assumed and an error in the area of the braking system is assumed.

In one preferred exemplary embodiment, the relative wheel contact patch forces are also determined on the basis of the braking forces of the wheel brakes of one axle. These values are then used within the framework of step 308 to pinpoint the possible error. If deviations are apparent between the relative wheel contact patch forces of both axles, then, on the basis of the relative wheel contact patch forces of one axle, the possibly defective wheel brakes are ascertained and disabled.

Following step 308, i.e., given a "no response" in step 306, the program segment is ended and repeated at the appropriate time.

What is claimed is:

1. A method for controlling a braking system of a vehicle having at least two wheels and at least two wheel brakes, the method comprising the steps of:

actuating the at least two wheel brakes as a function of a setpoint value;

determining, after a time delay, at least one of exerted braking forces and exerted braking torques at each of the at least two wheel brakes;

determining, as a function of a relationship between wheel contact patch forces and the at least one of the exerted braking forces and the exerted braking torques, relative wheel contact patch forces between the at least two wheels;

maintaining, in predefined operating states, actual slip values of each of the at least two wheels at a predefined setpoint slip using a closed-loop control;

wherein, after the time delay, a same tire-road interface friction coefficient exists due to a slip control of the at least two wheels; and wherein the setpoint value for each of the at least two wheel brakes is a setpoint slip value.

2. The method according to claim 1, wherein the braking system includes an electromotive brake application.

3. The method according to claim 1, wherein a proportionality constant represents the relationship between the wheel contact patch forces and the at least one of the exerted braking forces and the exerted braking torques.

4. The method according to claim 3, further comprising the step of retrieving, from the proportionality constant, coefficients of friction of brake linings of the at least two wheel brakes, friction radii, and a brake design.

5. The method according to claim 1, further comprising the step of determining the relative wheel contact patch forces based upon the braking forces of the at least two wheel brakes of different axles.

6. The method according to claim 1, further comprising the step of detecting variations at the at least two wheel brakes by running a plausibility check on the determined relative wheel contact patch forces.

7. The method according to claim 1, wherein the step of determining the relative wheel contact patch forces includes the step of retrieving average values of detected braking forces.

8. The method according to claim 1, wherein the determined relative wheel contact patch forces are used for one of an anti-lock control, a traction control, an operating dynamics control, and a chassis control.

9. A device for controlling a braking system of a vehicle having at least two wheels, comprising:

an electronic control unit;

a setpoint value generator within the electronic control unit, the setpoint value generator forming setpoint slip values for each of the at least two wheels;

a slip regulator within the electronic control unit, the slip regulator receiving both the setpoint slip values from the setpoint value generator and actual slip values, the slip regulator using a closed-loop control to maintain actual slip values of each of the at least two wheels at the setpoint slip values;

means, within the electronic control unit, for determining at least one of braking forces and braking torques exerted at the at least two wheels and for calculating relative wheel contact patch forces between the at least two wheels as a function of a relationship between wheel contact patch forces and the at least one of the exerted braking forces and the exerted braking torques;

wherein, due to a slip control at the at least two wheels, a same road-tire interface friction coefficient exists at the at least two wheels after a time delay.

* * * * *